(12) United States Patent
Kieu et al.

(10) Patent No.: US 8,384,991 B2
(45) Date of Patent: Feb. 26, 2013

(54) SATURABLE ABSORBER USING A FIBER TAPER EMBEDDED IN A NANOSTRUCTURE/POLYMER COMPOSITE AND LASERS USING THE SAME

(75) Inventors: Khanh Kieu, Ithaca, NY (US); Frank W. Wise, Ithaca, NY (US)

(73) Assignees: Cornell University, Ithaca, NY (US); The Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 12/977,657

(22) Filed: Dec. 23, 2010

(65) Prior Publication Data

US 2011/0280263 A1    Nov. 17, 2011

Related U.S. Application Data

(63) Continuation of application No. PCT/US2009/048964, filed on Jun. 26, 2009.

(60) Provisional application No. 61/076,116, filed on Jun. 26, 2008.

(51) Int. Cl.
*H01S 3/00*    (2006.01)

(52) U.S. Cl. ............... 359/337; 372/3; 372/18; 372/76; 385/122

(58) Field of Classification Search ........... 385/122; 372/3, 18, 76; 359/337
See application file for complete search history.

(56) References Cited

U.S. PATENT DOCUMENTS

| 6,567,430 | B1 * | 5/2003 | Islam et al. ............... 372/3 |
| 2002/0041618 | A1 * | 4/2002 | Watanabe et al. ........... 372/76 |
| 2005/0058415 | A1 * | 3/2005 | Lee et al. ............... 385/122 |
| 2006/0198399 | A1 * | 9/2006 | Jablonski et al. ........... 372/10 |
| 2006/0222024 | A1 * | 10/2006 | Gray et al. ............... 372/18 |

OTHER PUBLICATIONS

Song, Yong-Won et al., Polarization insensitive all-fiber mode-lockers functioned by carbon nanotubes deposited onto tapered fibers, Applied Physics Letiers 90, 021101 (2007).

* cited by examiner

*Primary Examiner* — Mark Hellner
(74) *Attorney, Agent, or Firm* — William A. Blake

(57) ABSTRACT

A saturable absorber (SA) is constructed using a fiber taper embedded in a carbon nanotube/polymer composite. A fiber taper is made by heating and pulling a small part of standard optical fiber. At the taper's waist light is guided by the glass-air interface, with an evanescent field protruding out of the taper. Carbon nanotubes mixed with an appropriate polymer host material are then wrapped around the fiber taper to interact with the evanescent field. Saturable absorption is possible due to the unique optical properties of the carbon nanotubes. The device can be used in mode-locked lasers where it initiates and stabilizes the pulses circulating around the laser cavity. The SA can be used in various laser cavities, and can enable different pulse evolutions such as solitons, self-similar pulses and dissipative solitons. Other applications include but are not limited to optical switching, pulse cleanup and pulse compression.

20 Claims, 3 Drawing Sheets

SATURABLE ABSORBER USING A FIBER TAPER EMBEDDED IN A NANOSTRUCTURE/POLYMER COMPOSITE AND LASERS USING THE SAME

CROSS REFERENCE TO RELATED APPLICATIONS

This application is a continuation under 35 U.S.C. 120 and 365(c) of International Application No. PCT/US2009/048964, which was filed on Jun. 26, 2009, designates the U.S. and claims the benefit under 35 U.S.C. 119(e) of US Provisional Application No. 61/076,116, filed Jun. 26, 2008, which is hereby incorporated by reference in its entirety.

GOVERNMENT SPONSORSHIP STATEMENT

This invention was made with Government support from the National Institutes of Health (NIH) under grant number EB002019 and by the National Science Foundation (ECS-0500956). The Government has certain rights in the invention.

BACKGROUND OF THE INVENTION

1. Field of the Invention

The present invention is directed to an all-fiber saturable absorber (SA) and various laser designs employing the same. The saturable absorber is constructed using a fiber taper embedded in a nanostructure/polymer composite.

2. Description of the Background Art

Mode-locked lasers producing femtosecond pulses have found numerous applications in material processing, supercontinuum generation, ultraprecise frequency measurement, and many other significant areas of modern technology. Recently, mode-locked fiber lasers have attracted considerable attention due to the possibility of producing subpicosecond pulses in a compact, low-cost package. Many commercial mode-locked fiber lasers use semiconductor saturable absorber mirrors (SESAMs) for initiating and stabilizing the pulses inside the laser cavity. However, a SESAM is a complex and expensive device, which also requires cumbersome alignment, thus reducing the advantages of an all-fiber format.

In the past few years, a new type of fast saturable absorber based on single-walled carbon nanotubes (SWCNTs) has been discovered and extensively investigated. The advantages of the new saturable absorber include ultrafast saturation recovery time ($\approx$800 fs), a wide working wavelength range, a high damage threshold, and low cost. Different methods of incorporating SWCNT-based saturable absorbers inside laser cavities (both fiber and bulk solid-state lasers) have been proposed, and different results for mode-locked lasers have been demonstrated. The majority of the proposed techniques, however, have unavoidable drawbacks, especially when applied to fiber lasers. For example, saturable absorbers based on SWCNTs coated directly on one of the laser cavity's mirrors require additional alignment and protection. When SWCNTs are incorporated between two fiber ferrules in a standard fiber connector, there is physical contact between the tubes and the polished fiber ends, making the device vulnerable to damage and difficult to control. Saturable absorbers applied to D-shaped fibers have the advantage of compatibility with the all fiber format, but they turn out to be polarization sensitive. In addition, the process of manufacturing such devices appears to be fairly complex.

Meanwhile, all-fiber lasers have recently attracted significant interest. CW and Q-switched fiber lasers are now capable of achieving high average power, comparable to or even better than traditional solid-state lasers such as Nd:YAG. The fiber format offers crucial practical advantages including passive air cooling and freedom from alignment and maintenance. High efficiency combined with the possibility of direct diode pumping make fiber lasers attractive for many applications, especially in material processing.

Recent progress in thulium (Tm) and holmium (Ho) doped fiber lasers has enabled the demonstration of high-power fiber lasers in the mid-infrared region. Average powers up to 100 W and 68% efficiency have been demonstrated in Tm- and Ho-doped fiber lasers. The possibility of achieving quantum efficiency greater than one due to cross-relaxation energy transfer processes makes this class of fiber lasers very attractive. Furthermore, for many applications in nonlinear optics, medicine and sensing, integrated and robust laser sources around 2 micron wavelength are needed. Tm-doped fiber is known to have a broad and smooth fluorescent spectrum, which is suitable for generating ultrashort pulses. However, only a few mode-locked oscillators based on Tm fiber have been reported.

Nonlinear polarization evolution (NPE) has been used to demonstrate a mode-locked thulium fiber laser that generated 500-fs pulses. A semiconductor saturable absorber mirror (SESAM) has been used in a Tm fiber laser to achieve 190-fs pulses. In ultrafast fiber lasers, NPE and SESAMs are widely used to provide amplitude modulation. However, these two techniques have drawbacks. NPE requires additional elements in the cavity, including a polarizer and polarization controllers. Furthermore, fiber lasers mode-locked with NPE will generally not be environmentally-stable. SESAMs have recently become readily-available, but tend to be damaged in fiber lasers, perhaps owing to the large modulation depth that is needed.

The development of new pulse-shaping mechanisms in fiber lasers allow the generation of high-energy femtosecond pulses. In stretched-pulse, self-similar and wave-breaking-free mode-locked lasers some degree of dispersion compensation is needed. When the laser is designed to operate around 1 µm wavelength, dispersion compensation is implemented either with bulk components, or with microstructured fibers or chirped fiber Bragg gratings. The former approach produces the best performance but undermines some of the benefits of fiber. The latter approach improves the integration but typically results in major performance sacrifices.

Recently, a Yb-doped femtosecond fiber laser was demonstrated without anomalous dispersion in the cavity. The pulse-shaping mechanism is based on strong spectral filtering of a highly-chirped pulse in the laser cavity, and the pulses are dissipative solitons. Pulse energy as high as 26 nJ has been demonstrated with this design. However, bulk components were also present in the laser cavity, which again sacrificed the advantages of fiber format.

All-fiber versions of the normal-dispersion lasers should have tremendous potential for applications. Several groups have investigated all-fiber lasers at 1 µm wavelength. Of course, dispersion control is not required for saturable-absorber mode-locking with picosecond pulse durations; under these conditions, dispersion and nonlinear phase modulation do not contribute appreciably to pulse-shaping. A simple dispersion-compensation-free laser which generates low-energy picosecond pulses has been demonstrated in which a SESAM with high modulation depth shapes the pulses. In another all-fiber oscillator, mode-locking through NPE used a Faraday mirror was used in combination with angle-splicing of PM fibers.

Saturable absorbers based on fiber tapers coated with SWCNTs appear to be the best solution for fiber-based femtosecond pulsed laser applications. These devices are polarization insensitive, and their fabrication process is not complicated. Nevertheless, saturable absorbers based on fiber tapers with SWCNTs directly sprayed on the taper's surface exhibit significant losses caused by scattering. Due to this drawback, the saturable absorber would work only if the SWCNTs were deposited on a very short length at a designated area of the taper.

SUMMARY OF THE INVENTION

The present invention is directed to an improved design for a robust and efficient all-fiber saturable absorber (SA) and various laser designs employing the same. The saturable absorber is preferably constructed using a fiber taper embedded in a nanostructure/polymer composite. A fiber taper is made by heating and pulling a small part of standard optical fiber. At the taper's waist light is guided by the glass-air interface, with an evanescent field protruding out of the taper. SWCNTs or other suitable nanostructures mixed with an appropriate polymer host material are then wrapped around the fiber taper to interact with the evanescent field. Saturable absorption is possible when the diameter of the SWCNTs or other nanostructures is chosen so that the SWCNT or other nanostructure absorbs light at the wavelength of incident light. One particularly significant application of the SA is in mode-locked lasers where it plays the role of initiating and stabilizing the pulses circulating around the laser cavity. Advantages over known types of SAs include construction in an in-line fiber format, large operating wavelength range and simplicity of the fabrication process. In this geometry the absorption is distributed, and so is the generated heat, which allows reliable operation at much higher power. The SA can be used in various laser cavities, and can enable different pulse evolutions such as solitons, self-similar pulses and dissipative solitons. Furthermore, the SA may find use in other applications including but not limited to optical switching, pulse clean-up and pulse compression.

Preferably, the fiber tapers are fabricated by using a standard flame brushing and pulling technique. After pulling, the tapers are 30-50 mm long adiabatic tapers with diameters in the 3-7 μum range. Note that at these dimensions the transmitted light is no longer confined within the taper but leaks into the surrounding air as well; in other words, there is a substantial evanescent field in the air, just outside the glass fiber taper. The evanescent field will interact with any material medium brought to the vicinity of the taper, which, in this case, will be the SWCNT/polymer composite.

The diameter of the SWCNTs determines the wavelength range over which strong absorption of light will occur. For example, 0.8-nm diameter places the absorption resonance near 1 μm wavelength, while 1.5-nm diameter places the absorption resonance near 2 μm wavelength. The length of the SWCNTs does not affect their optical properties. SWCNTs approximately 10 microns long have been used. Shorter SWCNTs, 1-5 nm in length, are now available and should also work. Unlike previous uses of SWCNTs in saturable absorbers, instead of spraying the nanotubes directly on the taper, the nanotubes are first mixed with a transparent, low-refractive-index polymer, such as a silicone elastomer, and then the fiber taper is coated with this mixture. The taper becomes the core of the resulting waveguide, and the composite becomes the cladding. To ensure that the tapered section acts as a waveguide, the composite must have refractive index lower than that of the fiber. Silica fiber has a refractive index of approximately 1.5, and polymers with a range of refractive indices below 1.5 are available. The refractive index of the polymer is chosen to control the guided mode profile, specifically the extension of the evanescent field into the composite. This determines the degree of interaction of the field with the SWCNTs. Since it is fairly easy to form a uniform composite of SWCNTs within the elastomer matrix using conventional ultrasonic and magnetic stirring techniques, the scattering losses of the resulting saturable-absorber tapers are low. The cured silicone coating also protects the fragile taper from environmental contamination, and provides adequate mechanical support, allowing the taper to be packaged into a rugged and robust device.

The resulting SAs are useful in a number of applications, but are especially useful in all-fiber mode locked lasers. Three different laser embodiments are disclosed herein which employ the subject SA.

BRIEF DESCRIPTION OF THE DRAWINGS

The features and advantages of the present invention will become apparent from the following detailed description of a number of preferred embodiments thereof, taken in conjunction with the accompanying drawings which are briefly described as follows.

DETAILED DESCRIPTION OF THE PREFERRED EMBODIMENTS

Figure 1:
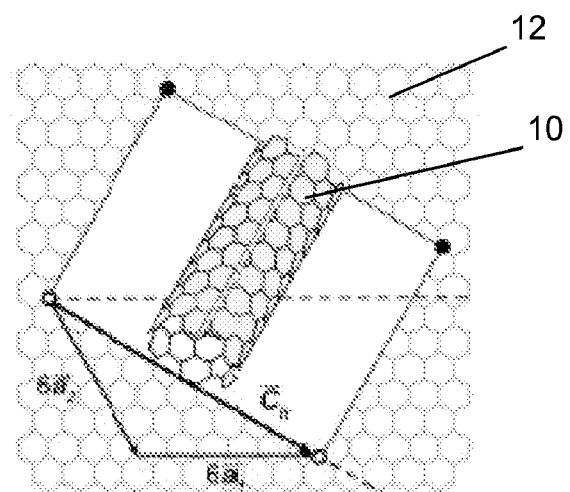
FIG. 1 is schematic diagram of a single walled carbon nanotube (SWCNT) illustrating that it consists of a cylindrical sheet of graphene.

With reference to FIG. 1, a single-walled carbon nanotube (SWCNT) 10 is illustrated. Typically, the SWCNT has a diameter of close to 1 nanometer. The length can range from microns to millimeters. The structure of a SWCNT can be conceptualized by wrapping a one-atom-thick sheet of carbon atoms 12 called graphene into a seamless cylinder. In experiments used to verify the operability of the subject invention, commercially available SWCNTs made by a high pressure CO process are used, and they are mixed (without any additional purification process) with a low-refractive-index silicone elastomer, such as Polydimethylsiloxane made by Dow Corning, using standard magnetic stirring for 24 hours.

To test the absorption spectrum of SWCNTs, a solution of SWCNTs in alcohol was prepared and sprayed on a microscope slide; the absorption spectrum of the SWCNTs was then measured using a spectrometer. An analysis of the absorption spectrum of SWCNTs with approximately 1.2-nm diameter shows that the peak of the absorption spectrum is approximately 1400 nm, but there is significant absorption at the 1550-nm wavelength of erbium-doped fiber.

Preferably, the fiber tapers are fabricated by using a standard flame brushing and pulling technique. During the pulling process, the optical transmission of the taper was monitored using a narrow linewidth diode laser and a power meter. After pulling, the tapers were 30-50 mm long adiabatic tapers with diameters in the tapered section in the 3-7 µm range. These diameters are typical for use with standard silica fiber and wavelengths between approximately 1 and 2 µm. Taper diameters as small as 1 µm could be used, and larger taper diameters may be appropriate in some cases. The total loss introduced during the pulling process is typically less than 1%. Note that at these dimensions the transmitted light is no longer confined within the tapered section of the fiber, but leaks into the surrounding air as well; in other words, there is a substantial evanescent field in the air, just outside the glass fiber taper. The evanescent field will interact with any material medium brought to the vicinity of the taper, which, in this case, will be the SWCNT—polymer composite.

Fiber tapers fabricated by the aforementioned method were fixed into a groove with the aid of an epoxy. The prepared polymer-nanotube composite was then poured into the groove until it filled the region surrounding the tapered section of the fiber and the liquid was allowed to cure for approximately 12 hours until it hardened. The nanotubes in the polymer matrix can thus interact with the evanescent field that surrounds the taper, causing a fair amount of absorption loss for the light that passes through the (embedded) tapered section of the fiber. In experiments, the polymer matrix itself (refractive index n≈1.4) does not cause a significant loss in transmission (<2%); the loss is primarily due to the interaction between the evanescent field and the SWCNTs dispersed in the polymer matrix. Since the SWCNTs are fully dispersed into the matrix, rather insignificant scattering losses are expected in the device. The absorption of the light passing through an embedded taper can be readily controlled by changing the concentration of the nanotubes within the polymer matrix or by varying the various dimensions (length or diameter) of the tapered region while keeping the concentration of the nanotubes constant.

Figure 2:
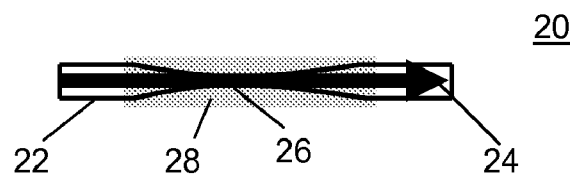
FIG. 2 is a schematic illustration of a saturable absorber that is constructed in accordance with a preferred embodiment of the present invention and employs a tapered optical fiber having a polymer matrix containing SWCNTs or other nanostructures disposed thereon.

FIG. 2 illustrates the end result comprising a saturable absorber 20. The SA 20 includes an optical fiber 22 for transmitting an optical pulse 24. The optical fiber 22 includes a tapered section 26 formed using the pulling operation discussed previously. The diameter of the tapered section 26 is preferably on the order of 3-7 µm, while the length of the tapered section 26 is anywhere between 30 and 300 mm. A composite material illustrated by the block 28 made up of SWCNTs or other suitable nanostructures mixed with an appropriate polymer host material is wrapped around the fiber tapered section 26 to interact with the evanescent field generated by the optical pulse as it passes though the tapered section 26.

Figure 3:
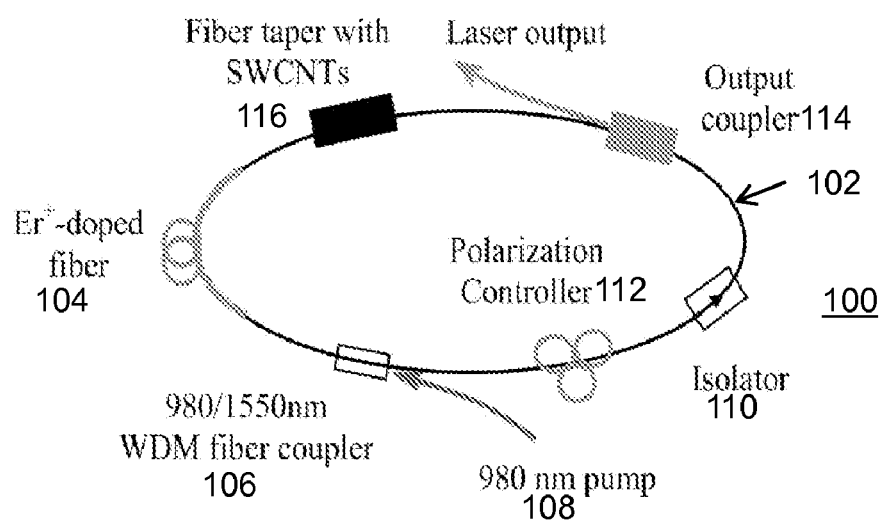
FIG. 3 is a diagram of a first mode-locked fiber ring laser incorporating the saturable absorber of FIG. 2.

To test the quality of the embedded tapers, the transmission of light at the appropriate wavelength is measured as a function of intensity. Increased transmission (decreased loss) at higher power confirms saturable absorption. Attempts were made to mode-lock different fiber ring lasers with a taper placed in the laser cavity, acting as a saturable absorber. FIG. 3 shows a typical configuration of the test fiber ring lasers 100. The ring or cavity 102 consists of a 2 m length of erbium-doped fiber (Leikki) 104, about 1 m of Flexcor fiber in the WDM coupler (Corning) 106, and about 12 m of SMF28 (Corning). The approximately 2 m of Er-doped fiber 104 has an absorption at λ=980 nm of ≈11 dB/m. The active fiber is pumped by a single-mode telecom-grade diode laser 108 operating at 980 nm via the fused 980/1550 WDM fiber coupler 106. An all-fiber optical isolator 110 is added to the cavity to ensure unidirectional operation. For optimal operation, a polarization controller 112 is used to adjust the polarization state of the light within the cavity. The fused output-coupler 114 extracts a fraction of the light circulating inside the cavity 102.

Using a 2% output-coupler, modelocking could be achieved even with low-loss embedded tapers (absorption ≈5%) as a saturable absorber 116; however, the average output power in this case was limited to less than 2.0 mW. To increase the average output power (and, consequently, the energy content of each pulse), a 3 dB output-coupler was used. Under these circumstances, the laser could be mode-locked only when embedded tapers with a larger absorption (transmission loss >40%) were used. In these experiments, an embedded fiber taper whose absorption loss was nearly 70% was employed for the SA 116.

As the pump power increases, the laser starts to operate in a (quite stable) Q-switching regime. When the pump power is raised further to approximately 90 mW, the laser begins to mode-lock and produce single pulses per roundtrip (repetition rate ≈13.3 MHz, output power ≈2.5 mW). This occurs without any Q-switching envelope or any cw light in the background, assuming that the polarization controller is properly adjusted. With ≈260 mW of pump power, the maximum average output power of 23 mW was achieved, corresponding to 1.73 nJ pulse energy. At high levels of pump power, pulse splitting was observed in agreement with the theory of soliton lasers. However, due to the strong modulation depth of the saturable absorber 116, it was always possible, by adjusting the polarization controller 112, to force the split pulses to collapse into a single pulse. Theoretically, this regime of operation may correspond to the formation of high-order solitons within the cavity, which are sustained at higher pulse energies.

The results of the experiment showed that when the average output power is 23 mW; the measured FWHM bandwidth of the laser in this case was 4.3 nm. Sidebands were observed as a result of the periodic perturbation of the laser cavity, as expected. The mode-locked output pulse train of the ring laser had an observed pulse period of ≈75 ns, corresponding to a repetition rate of ≈13.3 MHz. The RF spectrum of the first (fundamental) harmonic of the laser pulse train was found to have a span of 200 kHz. To measure the pulse duration of the mode-locked ring laser, an interferometric autocorrelator was used. The inferred FWHM pulse duration is approximately 645 fs (assuming a $sech^2$ pulse shape) for pulses at a lower pump power (a fundamental soliton regime). At a maximal pump power of ≈260 mW, the pulses became shorter, ≈594 fs in duration, but they were accompanied by a broad pedestal.

The saturation absorption behavior of the embedded fiber tapers was measured directly, using the output of the mode-locked laser. For this purpose, the output of the fiber ring laser was split into two separate channels, using a 2/98% fused-tap fiber-coupler. The 2% channel was monitored by a power meter for reference. The 98% channel was subsequently spliced onto one end of an embedded fiber taper, and the total transmission loss through the taper was measured using a second power meter at the other taper's end. The results of these measurements showed that the embedded taper used in this experiment had an initial loss of ≈89%, as measured with a low-power diode laser. With an increasing average power of the mode-locked laser (corresponding to a larger peak power from individual pulses), the loss of light in passing through the taper is reduced, indicating that absorption has been saturated. For the particular taper used in this experiment, the observed reduction in absorption (due to saturation) is more than 10%.

Another laser embodiment using the saturable absorber based on a fiber taper that is embedded in an SWCNT/polymer composite of the subject invention comprises a mode-locked Tm fiber laser that employs only fiber-format components. The laser produces 750-fs solitons with 0.5 nJ pulse energy and 25 mW average power. The laser has been operated for many hours with no sign of degradation of the saturable absorber.

Figure 4:
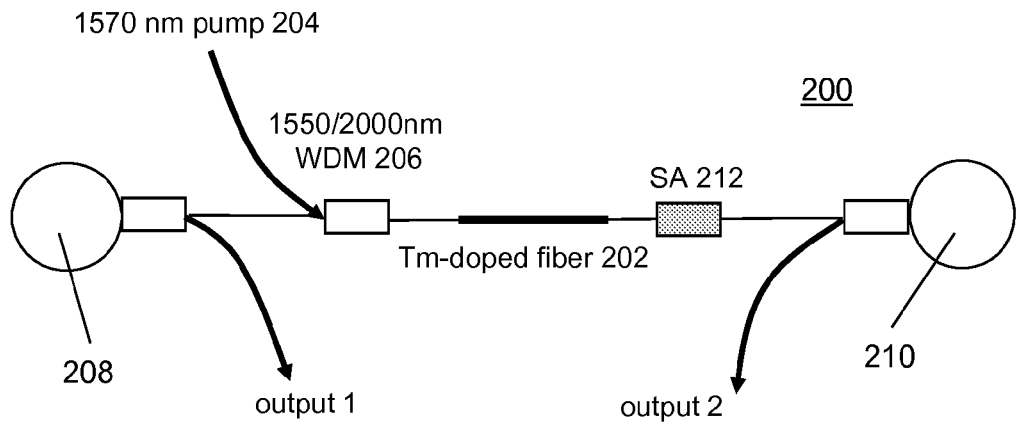
FIG. 4 is a diagram of a Thulium-based all-fiber laser embodiment of the invention incorporating the saturable absorber of FIG. 2.
Figure 5:
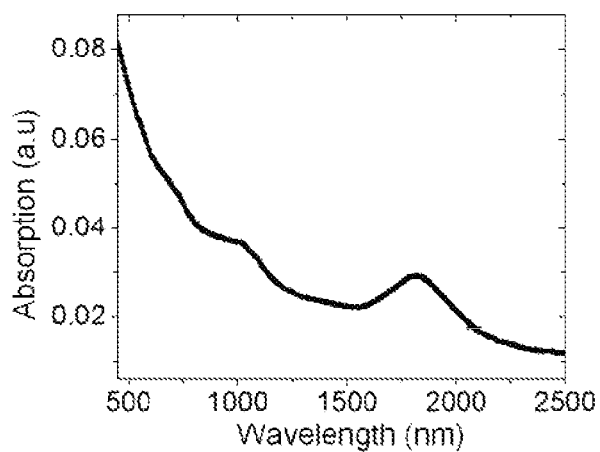
FIG. 5 is a graph showing the absorption spectrum of the saturable absorber employed in the laser embodiment of FIG. 4.

The Tm laser 200 is shown schematically in FIG. 4. It contains ~70 cm of Tm/Ho co-doped fiber 202 with 9-μm core diameter and ~60 dB/m absorption at 1570 nm. The gain fiber 202 is pumped in-core by an Er fiber laser 204 that emits near 1570 nm, through a WDM fiber coupler 206. The fluorescence spectrum of the gain fiber measured at low pump power covers the range 1.65 μm to 2.1 μ.m. The cavity is formed between two loop mirrors 208 and 210 based on 2×2 fused couplers. The reflectivities of the loop mirrors are ~40% and 5%. The fiber ends at the outputs have to be angle-cleaved to avoid feedback into the cavity, which would prevent or extinguish mode-locked operation. The saturable absorber (SA) 212 is fabricated using the technique discussed previously. The only difference in this embodiment is that SWCNTs with larger average outer diameter (~1.5 nm) are used, to place the absorption band near 2 μm as illustrated in the graph of FIG. 5. The total loss of the SA 212 was measured to be 50%. The total dispersion of the cavity is estimated to be ~−0.2 $ps^2$.

Mode-locking occurs when the pump power is increased to 320 mW, without any adjustment of the laser cavity. However, the laser tends to start in a multiple-pulsing regime. Single-pulsing is then achieved by reducing the pump power to about 200 mW. The output power spectrum has a center wavelength is 1885 nm and a bandwidth of 6 nm. The spectrum shows the characteristic sidebands of soliton pulse shaping. Their locations agree with the positions expected from the estimated dispersion and pulse duration. The pulse duration is 750 fs assuming a sech pulse shape. The corresponding time-bandwidth product is 0.37, which is close to the theoretical value for transform-limited solitons.

At 200 mW pump power, the laser generates 25 mW from output 1 and 2 mW from output 2. The repetition rate of the laser is 45 MHz, so the pulse energy is ~0.5 nJ. We estimate the output (1) coupling to be 0.95, which explains why the energy of a soliton pulse can be so high. Mode-locking is maintained even when the fiber in the cavity is perturbed mechanically or moved, although the polarization state does change. The polarization state of the output is normally elliptical, with random orientation of the main axes. The polarization state is stable from pulse to pulse, and changes only when the fiber in the cavity is perturbed. This stability is attributed to the absence of polarization-sensitive components in the cavity. The output polarization can be controlled by including an inline polarizer in the cavity, but adjustment of the polarizer has little impact on the modelocking. This indicates that the saturable absorber provides significant self-amplitude modulation, which dominates any residual NPE that arises from the lack of polarization control.

Figure 6:
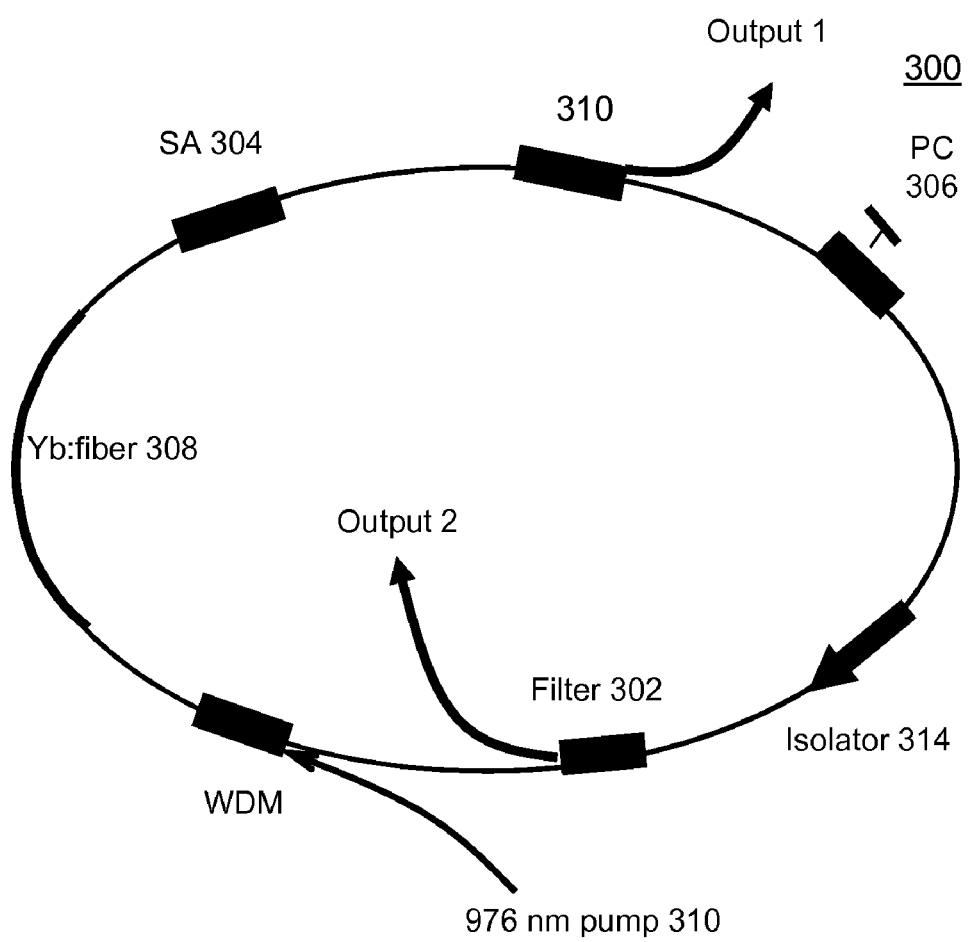
FIG. 6 is a diagram of an all-fiber normal dispersion laser embodiment incorporating the saturable absorber of FIG. 2.

In yet another embodiment of the invention as illustrated in FIG. 6, the saturable absorber of the invention is employed in an all-fiber femtosecond laser 300 with only normal-dispersion components in the cavity. The design of the laser is conceptually similar to what has been demonstrated previously, but fiber components replace the bulk components of earlier versions. Spectral filtering is achieved with a fused fiber coupler based filter 302. Mode-locking is initiated and stabilized by a fiber-format saturable absorber 304 based on carbon nanotubes, similar to those used in the other embodiments of the invention. All-fiber versions of the normal-dispersion femtosecond lasers should be very attractive for applications, and it should be possible to improve the performance achievable with the design described here.

The spectral filter 302 employed is based on a fiber coupler operating in the over-coupled regime. It is well-known that a fused fiber coupler exhibits strong spectral filtering when it is made so that many power-transfer cycles occur along the tapered and fused portion of the coupler. The fused coupler was fabricated in the laboratory, and a nearly sinusoidal transmittance was observed, with pass-bands about 15 nm wide (full-width at half-maximum) and minimal loss (<10%). The maximum transmission of the through-port occurs at 1030 nm, and we expect to use this port to form the laser cavity. A small fraction of the laser light is extracted by the cross-port of the filter, and this can be used as a monitoring output.

The fused-coupler filters that have been made to date have fairly strong polarization dependence. The output wavelength of the laser in continuous-wave operation can be tuned by adjusting the polarization controller 306. This feature is undesirable because it will lead to some residual NPE in the cavity. We have found it difficult to eliminate the polarization dependence of the filters with the present fabrication approach.

In this embodiment, the SWCNTs for the SA 304 were chosen to have diameter of 0.8 nm, which places their absorption band around 1 μm. The version used in the 1-μm laser described here follows the geometry of the previous embodiments, with the polymer modified to allow appropriate extension of the evanescent field into the nanotubes. The length and diameter of the fiber taper are ~300 mm and 5 mm, respectively. Simulation reveals that the optical field along the fiber taper waist is more confined in the case of 1-μm wavelength than with the 1.5-μm wavelength embodiment of FIG. 3. As a result, for a given diameter, the evanescent field outside the fiber taper is smaller, which reduces the interaction of the optical field with the carbon nanotubes. Several approaches to this problem were considered: i) the use of fiber tapers with very small diameters, ii) increasing the concentration of SWCNTs in the host polymer, and iii) modification of the refractive index of the polymer to enhance the evanescent field outside the taper. SAs with small diameters tended to be damaged during laser operation. Increasing the concentration of SWCNTs produced greater non-saturable loss due to scattering. It was found that modification of the refractive index of the host polymer was the most effective solution. The refractive index of the polymer used in this embodiment is 1.44 at wavelengths around 1 μm. The modulation depth of the SA was estimated by measuring the transmittance of a femtosecond pulse train as a function of average power. The unsaturated transmittance of the SA is ~44%, and the measured modulation depth is ~15%.

This geometry for the saturable absorber is believed to offer significant advantages for high-power operation. Fiber lasers tend to have large output coupling, and thus require SAs with large modulation depth. This in turn tends to imply large energy deposition in the SA. Semiconductor saturable-absorber mirrors (SESAMs) consistently tend to damage in high-power fiber lasers and thin films of carbon nanotubes deposited on the end of a fiber are believed to have similar problems. In contrast to SAs in which the absorption (and generated heat) is localized in a thin (~1 μm) film, in the taper-based SAs of the subject invention, the absorption is distributed along the fiber taper, which is at least a few millimeters in length. As a result, the generated heat is distributed and the problem with damage is mitigated. Damage has been observed only when the taper is very thin (~1-2 µm diameter) and the loading of SWCNTs in the polymer host is high.

The fiber-format filter 302 and saturable absorber 304 are introduced into the laser cavity as shown in FIG. 6. All the fiber is single-mode fiber, with 6 µm core diameter. The total length of the ring cavity is about 4 m, which corresponds to ~50 MHz repetition rate. The 50-cm Yb-doped gain fiber 308 is core-pumped by a 980-nm diode laser 310. The SA 304 follows the gain fiber 308, and a 50/50 fused coupler serves as the output coupler 312. To enable unidirectional operation a fiber-coupled polarization-independent isolator 314 is spliced in after the output coupler 312. The filter 302 follows the isolator 314. The total cavity dispersion is 0.090 ps$^2$.

As a control experiment, we attempted to mode-lock the laser without the spectral filter 302 in the cavity, without success. Without the SA 304 in the cavity we were also unable to observe any mode-locking. Due to the polarization sensitivity of the fused coupler filter 302, the polarization controller 306 is needed in the cavity. Although we expect the SA 304 to dominate the starting and stabilizing of the pulses, the operation of the laser is sensitive to the setting of the polarization controller 306. This suggests that NPE also plays some role in the pulse-shaping. At an arbitrary setting of the polarization controller 306 the laser operates in an unstable Q-switched and mode-locked regime. Self-starting mode-locked operation is achieved by adjusting the polarization controller 306. The threshold pump power for mode-locking is ~350 mW. The laser produces a stable pulse train with ~50 MHz repetition rate. Single-pulse operation is verified by using a long range (~100 ps) background-free autocorrelator in combination with a fast detector with 500-ps resolution. The spectrum is confirmed to be free of modulation, which could imply the presence of multiple pulses. The average output power is 155 mW with 400 mW pump power, which is the maximum that can be delivered by the pump diode. The pulse energy and efficiency are 3 nJ and 40%, respectively.

Typical power spectra of the laser 300 exhibit the characteristic features of pulse-shaping by spectral filtering at normal dispersion: steep sides, with peaks at the edges that are reduced by the filtering. A clear difference between output 1 and output 2 was noted, which is evidence of the strong influence of the spectral filter 302 on the pulse circulating inside the cavity. The laser generates 1.5-ps chirped pulses, which are dechirped to 235 fs duration with a grating pair outside the cavity.

The laser 300 operates quite stably, and mode-locking is sustained for many hours without readjustment of the polarization controller 306. If the pump laser is switched off and on again, the laser returns directly to the mode-locked state. However, moving the fiber in the cavity will unlock the laser. In this case, readjustment of the polarization controller 306 is needed to restore mode-locking. The SA 304 does not exhibit any evidence of damage due to thermal effects even at the highest pump power.

In conclusion, the all-fiber saturable absorber based on an adiabatic fiber taper embedded in a low refractive-index SWCNT—polymer composite has been found to be particularly useful for mode-locking in a variety of fiber-based lasers, including a soliton fiber laser based on Tm/Ho co-doped fiber and an all-fiber mode-locked laser at 1 µm without dispersion compensation in the cavity. The performance of the lasers is encouraging, and it is expected that the saturable absorber based on a fiber taper embedded in carbon nanotubes will find use stabilizing other pulse evolutions in 2-micron fiber lasers.

Although the present invention has been disclosed in terms of a number of preferred embodiments and variations thereon, it will be understood that the scope of the invention as defined in the following claims is not limited thereto.

The invention claimed is:

1. An optical device comprising:
   a saturable absorber for an optical pulse, said saturable absorber including:
      an optical fiber waveguide for guiding said optical pulse, said optical fiber waveguide having a tapered section of reduced diameter along a length thereof that is selected to allow an external evanescent field to be formed by an optical pulse as it passes through said tapered section of said optical fiber; and
      a composite material surrounding said tapered section of said optical fiber, said composite material comprising a polymer mixed with a plurality of nanostructures that are selected to absorb selected wavelengths in said optical pulse, said polymer being selected to have an index of refraction that allows said evanescent field guided in the tapered section of said optical fiber to interact with the nanostructures in the composite material,
      whereby, saturated absorption impresses self-amplitude modulation on said optical pulse as it passes through said tapered section of said optical fiber waveguide.

2. The optical device of claim 1, wherein said nanostructures comprise single walled carbon nanotubes.

3. The optical device of claim 1, wherein said polymer comprises a silicone elastomer.

4. The optical device of claim 1, wherein said diameter of said optical fiber in said tapered section is 7 µm or less and said length of said tapered section is 30 mm or more.

5. The optical device of claim 1, further including an optical laser cavity in which said saturable absorber is disposed.

6. The optical device of claim 5, wherein said laser cavity is an all-fiber laser cavity which includes a doped gain fiber in series with said saturable absorber, said doped gain fiber being doped with one or more materials selected from the group comprising ytterbium, thulium, holmium and erbium.

7. The optical device of claim 6, wherein said all-fiber laser cavity includes only normal dispersion components in said cavity.

8. The optical device of claim 7, wherein said all-fiber laser cavity includes a spectral filter formed from a fused fiber coupler.

9. The optical device of claim 4, wherein said laser cavity operates at a wavelength of between 1 and 2 µm and each of said nanostructures is a single walled carbon nanotube having a diameter of between 0.8 and 1.5 nanometers.

10. The optical device of claim 1, wherein said nanostructures comprise single walled carbon nanotubes and said polymer comprises a silicone elastomer.

11. The optical device of claim 10, wherein said diameter of said optical fiber in said tapered section is 7 µm or less and said length of said tapered section is 30 mm or more.

12. The optical device of claim 11, further including an optical laser cavity in which said saturable absorber is disposed, said laser cavity being an all-fiber laser cavity which includes a doped gain fiber in series with said saturable absorber, said doped gain fiber being doped with one or more materials selected from the group comprising ytterbium, thulium, holmium and erbium.

13. The optical device of claim 12, wherein said all-fiber laser cavity includes only normal dispersion components in said cavity.

14. The optical device of claim 13, wherein said all-fiber laser cavity includes a spectral filter formed from a fused fiber coupler.

15. The optical device of claim 12, wherein said laser cavity operates at a wavelength of between 1 and 2 μm and each of said single walled carbon nanotubes has a diameter of between 0.8 and 1.5 nanometers.

16. A method for making a saturable absorber comprising the steps of:
    pulling an optical fiber waveguide to form a tapered section along a length thereof therein having a reduced diameter that is selected to allow an external evanescent field to be formed by an optical pulse as it passes through said tapered section of said optical fiber; and
    embedding said tapered section of said optical fiber waveguide in a composite material comprising a polymer mixed with a plurality of nanostructures that are selected to absorb selected wavelengths in said optical pulse, said polymer being selected to have an index of refraction that allows said evanescent field formed in the tapered section of said optical fiber waveguide to interact with the nanostructures in the composite material,
    whereby, saturated absorption impresses self-amplitude modulation on an optical pulse as it passes through said tapered section of said optical fiber waveguide.

17. The method of claim 16, wherein said nanostructures comprise single walled carbon nanotubes.

18. The method of claim 17, wherein said polymer comprises a silicone elastomer.

19. The method of claim 16, wherein said diameter of said optical fiber in said tapered section is pulled down to 7 μm or less and said length of said tapered section is 30 mm or more.

20. The method of claim 16, wherein said polymer is selected to have an index of refraction that is less than that of said optical fiber waveguide.

* * * * *